Figure 1:
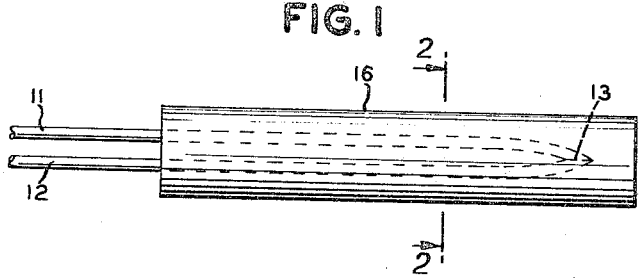

July 4, 1967     E. J. ADLER ET AL     3,329,534

THERMOCOUPLE WITH PLATINUM GROUP METAL INNER SHEATH

Filed Feb. 14, 1963

INVENTORS
EVERETT J. ADLER
HERBERT J. GREENBERG
BY John K. Conant

ATTORNEY 3,329,534
THERMOCOUPLE WITH PLATINUM GROUP METAL INNER SHEATH
Everett J. Adler and Herbert J. Greenberg, Livingston, N.J., assignors to Engelhard Industries, Inc., Newark, N.J., a corporation of Delaware
Filed Feb. 14, 1963, Ser. No. 258,515
1 Claim. (Cl. 136—233)

The present invention relates to thermocouples and particularly to an improved high temperature thermocouple of the type in which the thermoelectric wires of the thermocouple are encased in a jacket of insulating and refractory material.

In a typical thermocouple of the above type a pair of thermoelectric wires welded together at their ends to form a thermojunction are embedded in an insulating material and a jacket of a refractory metal is placed around the insulating material. At least one of the thermoelectric wires for a high temperature thermocouple may be made of or contain platinum or a platinum group metal or an alloy thereof. Magnesium oxide or aluminum oxide are particularly suitable insulating materials for high temperature thermocouples because of their insulating properties and also because they are normally inert with respect to platinum group metals and other metals which are commonly used for high temperature thermocouple elements.

A thermocouple having at least one thermoelectric wire containing a platinum group metal with refractory oxide insulation such as magnesium oxide or aluminum oxide around the wires and jacketed with tantalum provides an effective thermocouple for measuring temperatures at approximately 3000° F. At temperature levels from approximately 2500° F., however, the thermocouple quickly becomes inaccurate due to contamination of the platinum group metal, or metals, of the thermoelectric wires. In tests, the calibrations of such thermocouples drifted substantially due to contamination of the thermoelectric wires. It is believed that at this temperature the tantalum of the jacket reduces the oxide insulation and that the aluminum or magnesium reacts with platinum group metals in the thermoelectric wires thereby contaminating the wires and changing their thermoelectric voltage output.

In accordance with the present invention it was discovered that the problem of contamination in the 3000° F. temperature range was effectively eliminated by inserting an inner sheath of platinum or a platinum group metal between the aluminum oxide or magnesium oxide insulation and the tantalum jacket. Since the platinum or alloy of platinum of the inner sheath does not react either with the jacket material or insulating material—or in other words is inert with respect to them—at temperatures in the 3000° F. range, the inner sheath effectively separates the refractory jacket material from the insulating material which would otherwise react and contaminate the thermoelectric wires when the thermocouple is subjected to temperatures in excess of approximately 2500° F. It is therefore possible to make use of the superior high temperature refractory and insulating characteristics of tantalum and magnesium or aluminum oxide or other refractory metals or oxides to produce a thermocouple which remains accurate for prolonged periods of use at temperatures in the 3000° F. range.

It is a principal object of the present invention to provide an improved thermocouple for accurately recording temperatures in the neighborhood of 3000° F. for extended periods of use.

Figure 2:
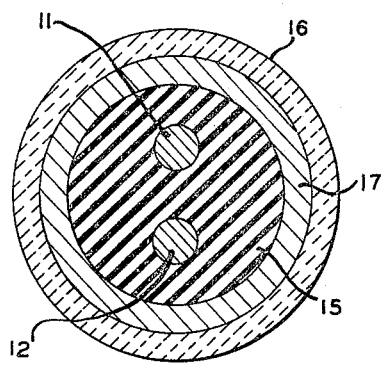

Further objects and advantages of the thermocouple protective jacket of the present invention will be apparent from the following description and accompanying drawings in which:

FIGURE 1 is a side view, partly in dash line, showing a thermocouple in accordance with the present invention; and FIGURE 2 is an enlarged section along the lines 2—2 of FIGURE 1.

Referring to the drawings a thermocouple of the present invention consists of a pair of thermoelectric wires 11 and 12 of different composition joined at 13 which is in the thermojunction.

As previously mentioned at least one of the thermoelectric wires 11 and 12 of a thermocouple for measuring temperatures in the neighborhood of 3000° F. may contain platinum or a platinum group metal.

As shown in FIGURE 2 the thermoelectric wires 11 and 12 are embedded in insulating material 15 which is normally magnesium oxide or aluminum oxide.

The insulating material must remain stable and inert with respect to the thermoelectric wires 11 and 12 at temperatures in the range from about 2500° F. to 3000° F. In thermocouples for use at temperatures around 3000° F. and the oxides of aluminum and magnesium are commonly used for this purpose.

The outside of the thermocouple is formed by an outer jacket 16 of high temperature refractory material. Refractory metals such as tantalum, columbium, tungsten and molybdenum are particularly suitable.

In accordance with the present invention an inner sheath 17 is around the insulating material 15 to separate the insulating material from the outer jacket 16. The inner sheath 17 is of material which is inert with respect to both the insulating material and acts as a barrier in preventing reaction of the outer jacket with insulating material at elevated temperatures.

In pracice platinum and the platinum group metals have proved to be effective materials for the inner sheath 17.

As previously mentioned, it is believed contamination of the thermoelectric wires 11 and 12 of previous thermocouples having an outer sheath 16 of tantalum and insulating material 15 of oxides of aluminum or magnesium has been caused by reduction of the oxide by the tantalum when the tantalum is subjected to temperatures up to 3000° F. In accordance with the present invention it has been found that providing an inner sheath 17 of material, such as platinum, which remains inert with respect to the insulating material 15 and the outer jacket 16 at high temperatures effectively eliminates the problem of contamination and permits use of tantalum for the outer jacket 16.

It will be understood that certain modifications of structure and substitution of elements of the present invention may be made without departing from the spirit or scope of the invention as set forth in the following claim.

What is claimed is:

A thermocouple comprising a pair of thermoelectric wires joined at one end at least one of which wires contains platinum group metal, aluminum oxide or magnesium oxide insulating material around the wires, said insulating material being inert with respect to the materials of the thermoelectric wires, an inner sheath of a platinum group metal around the insulating material, and an outer jacket of tantalum.

References Cited

UNITED STATES PATENTS

| 2,497,090 | 2/1950 | Miller et al. | 29—195 |
| 3,049,577 | 8/1962 | Hill | 136—200 X |
| 3,106,493 | 10/1963 | Japka | 136—234 |

WINSTON A. DOUGLAS, *Primary Examiner.*

A. M. BEKELMAN, *Assistant Examiner.*